United States Patent [19]

Lacoste et al.

[11] Patent Number: 4,748,500
[45] Date of Patent: May 31, 1988

[54] DEVICE FOR CORRECTING CONTOURS IN AN IMAGE AND USE OF SUCH A DEVICE IN A COLOR TELEVISION CAMERA

[75] Inventors: Jean P. Lacoste, Villeneuve La Garenne; Christian Mourier, Le Chesnay; Xavier Fleury, Garches, all of France

[73] Assignee: Thomson Video Equipment, Cergy Saint Christope, France

[21] Appl. No.: 870,016

[22] Filed: Jun. 3, 1986

[30] Foreign Application Priority Data

Jun. 5, 1985 [FR] France ............... 85 08532

[51] Int. Cl.$^4$ ............... H04N 9/64; H04N 9/09
[52] U.S. Cl. ............... 358/37
[58] Field of Search ............... 358/37, 50, 51

[56] References Cited

U.S. PATENT DOCUMENTS

| 3,681,520 | 8/1972 | Schneider | 358/37 |
| 3,732,360 | 5/1973 | Breimer et al. | 358/37 |
| 4,209,801 | 6/1980 | Dischert et al. | 358/37 |

FOREIGN PATENT DOCUMENTS

| 11674 | 7/1979 | European Pat. Off. |
| 1527219 | 5/1968 | France. |
| 2086101 | 12/1971 | France. |
| 8403242 | 5/1985 | Netherlands ............... 358/37 |
| 2126828 | 3/1984 | United Kingdom. |

Primary Examiner—John W. Shepperd
Attorney, Agent, or Firm—Cushman, Darby & Cushman

[57] ABSTRACT

A device is provided for correcting the contours in an image comprising in the green channel a contour extraction circuit followed by a circuit for processing these contours. It also comprises in the red channel a second contour extraction circuit followed by a second circuit for processing the contours. A validation circuit only validates the contour signal coming from the red channel when the red level is relatively high with respect to the green level. In this case, the red contour signal is superimposed on the contour from the green channel for correcting the contours of the three chrominance channels, by means of a mixing circuit.

5 Claims, 3 Drawing Sheets

DEVICE FOR CORRECTING CONTOURS IN AN IMAGE AND USE OF SUCH A DEVICE IN A COLOR TELEVISION CAMERA

BACKGROUND OF THE INVENTION

1. Field of the Invention

The invention relates to the field of color television cameras and more particularly to a contour correction devices required in such cameras.

The separating power of color picture taking tubes is limited by the thickness of the scanning spectrum. The result is a loss of resolution as a function of the frequency, which corresponds to an attenuation of the contours of the image. Moreover, the resolution in the vertical direction is limited by the number of scanning lines.

The purpose of contour correction devices is to compensate for such degradation, resulting in a limitation of the modulation rates, while enhancing the visual appearance of the image without increasing the noise thereof. an efficient contour correction is the result of a compromise between sufficient accentuation of the transitions in the vertical direction and in the horizontal direction of the image and a limitation of the noise, in particular in the uniform color areas.

2. Description of the Prior Art

Several correction systems have been brought into use up to present. The first system, performing well and at the same time representing a fairly simple system, consists in extracting the contour signal, that is to say the detail of the images, from the luminance signal. This method is applied in present coding systems where the pass band of the luminance channel is about four times greater than the pass band of the chrominance channels.

In fact, the first color television cameras were provided with four tubes supplying respectively the luminance Y and chrominance R, G, B signals. Contour corrections from the luminance signals, had the advantage of not being affected by convergence defects of the three color tubes, the modulation rate faithfully following the luminance law.

In the new cameras whose scanning system comprises three tubes, the luminance signal is formed from the green channel, and the details extracted from this channel are nonexistant for a considerable area of the triangle of the colors comprising the whole of the area close to red.

The conventional contour correction system consists in forming an image which is not a sharp image by means of a system of filters from the initial image. This processing is generally applied to the luminance channel alone or to the green channel alone. The differences between the initial image and the filtered image are then calculated to generate and a contour signal. This signal then has the noise removed and is shaped for generating a useful correction signal which is applied simultaneously:

to the filtered image for reconstituting the initial image with the noise removed, and to the reconstituted image for accentuating the contours after the gamma correction system so as to avoid disturbing this latter.

This correction signal is applied to each of the signals forming the video signal. An example of this type of correction is described in the U.S. Pat. No. 3,732,360. The results obtained with such a system are fairly satisfactory but are however limited by two major drawbacks:

the red and blue channels from which the noise has not been removed, corrected by the contour signals extracted from the green channel, increase the noise in the luminance signal;

the red and blue colors of some images with a low green level are without contours.

To overcome this disadvantage, it has been proposed, for example, in the application GB No. 2 126 828 to extract the contour signal from a luminance signal formed by a combination of signals. The combination coefficients, determined by experience, may be for a combination of the red channel and the green channel: 0.3 for the red channel and 0.7 for the green channel, and the combination gives 0.3 R+0.7 V. Thus, a balanced contour correction is obtained, representative of the luminance, in which a single channel for processing the contour is used, the resultant contour signal being applied to the different channels. Such a system has the advantage of being simple and economical but has a drawback: correction in the red adds contours to the black and white details and noise to the luminance. In addition, any lack of convergence between the green channel and the red channel gives rise to a visible splitting of the contour. Finally, such a solution does not allow the red contour and the green contour to be separately adjusted.

Another solution has been proposed in which the contour signal is formed from the maximum of two color signals, 0.3 R and G. This is obtained from the difference between the signals coming from the two non additive lattices processing respectively the net video signals and the filtered video signals, and extracting the maximum of the net or filtered 0.3 R and G signals. As a rule, this system causes red contours to appear if 0.3 R is greater then G and green contours if G is greater than 0.3 R. The coefficients have been defined as a function of representative cases of a color image, white detail on a black background of black detail on a white background. The coefficient 0.3 is the result of a compromise between a sufficient contour amplitude and limitation of the reduction of the green channel in black-red transitions. This system is also simple and economic like the above described system since it uses a single processing channel for the red and green contours but, also like the preceding system, it is impossible to separately adjust the red contour and the green contour. In addition, this system introduces a considerable reduction of contours in the white-red transitions.

SUMMARY OF THE INVENTION

The invention provides then a contour correction system which provides simultaneously:

maximum correction on the red details alone, from contour processing particular to the red channel, a minimum of correction in the red for the black and white details whose contours come from the green channel, a minimum of correction in the red in the case of a lack of convergence between the red and green channels for avoiding visible splitting of the contour.

According to the invention, a device for correcting the contours of chrominance signals coming from the scanning tubes of a color television camera, comprising in the green channel a circuit for extracting signals of the contours characteristic of the transitions in the green channel, a contour processing circuit connected to the extraction circuit, and two output adders respectively in each of the chrominance channels, coupled on the one hand to the inputs of the corresponding chrominance channels and, on the other, to a final contour correction signal output of the device, further comprises in the red channel a circuit for extracting signals of contours characteristic of transitions in the red chrominance signals, a validation circuit receiving the green and red chrominance signals and the red contour signal $C_R$ and delivering a validated red contour signal when the level of the red chrominance signal is appreciably higher than the level of the green chrominance signal, and a contour processing circuit connected to the output of the validation circuit, the correction device further comprising a mixing circuit, connected to the output of the two contour processing circuits delivering the final contour correction signal to the output adders.

The invention also provides for the use of a contour correction device in a color television camera.

BRIEF DESCRIPTION OF THE DRAWINGS

The invention will be better understood and other features will be clear from the following description with reference to the accompanying Figures in which.

DESCRIPTION OF THE PREFERRED EMBODIMENTS

The contour correction device of the invention comprises in the green channel a contour extraction circuit and a contour processing circuit similar to those used in conventional systems. However, in order to allow a separate adjustment of the contour correction depending on whether the green level is much higher than the red level or conversely, a second contour extraction circuit independent of the one disposed in the green channel, is provided in the red channel. Associated with this contour extraction circuit is a validation circuit which takes into account the respective green and red levels in the image, for validating the contour signal from the red channel or, on the contrary, for invalidating it. The contour signal from the red channel thus validated is then processed in the same way as the contour signal coming from the green channel, but independently thereof. The two resultant contour signals are combined before being applied together to the three chrominance channels for correcting each of the chrominance components by superimposing thereon the contour correction thus obtained.

Figure 1:
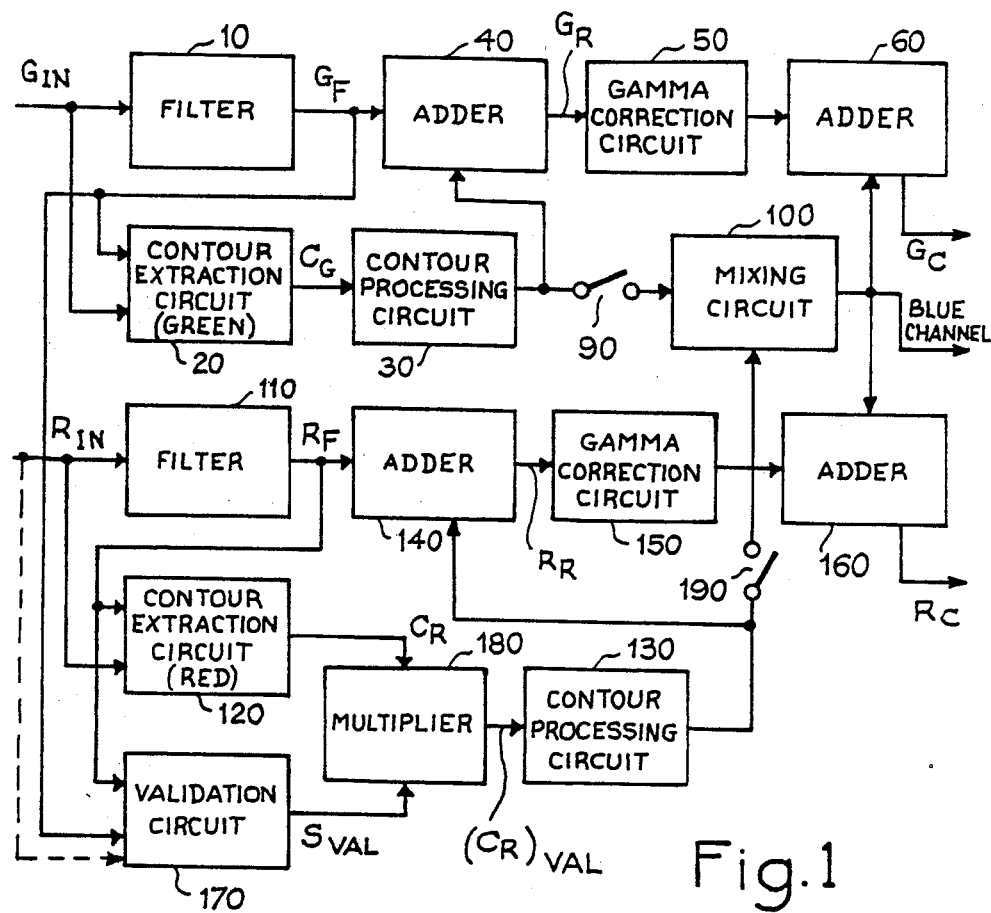
FIG. 1 is a block diagram of the contour correction device of the invention.

FIG. 1 is a block diagram of the contour correction device described briefly above. The video signal from the green tube $G_{IN}$, is applied to the input of a comb filter 10 whose output delivers a filtered green signal, $G_F$, in which the transition times are extended. The signals $G_{IN}$ and $G_F$ are applied to the two inputs of a green contour extraction circuit 20 which, by determining a difference between the signals $G_{IN}$ and $G_F$, elaborates the green contour signal $C_G$. This signal is applied to the input of a contour processing circuit 30 which eliminates the noise and adjusts the level and phase of this signal. The output signal of the processing circuit 30 is applied to the second input of an adder 40 whose first input receives the filtered green signal $G_F$ for reconstituting the green signal, $G_R$; the output signal of circuit 30 is also applied through a switch 90 to a first input of a mixing circuit 100 whose second input is connected through a switch 190, to the output of a contour processing circuit 130. The output of adder 40 is connected to the input of a gamma correction circuit 50 whose output is connected to the first input of the green channel output adder 60 which receives on its second input a contour correction signal and delivers the corrected green video signal $G_C$.

Similarly, the video signal from the red tube $R_{IN}$, is applied to a filter 110 which delivers the filtered red signal $R_F$. This filtered red signal $R_F$ and the red signal $R_{IN}$ are applied to a red contour extraction circuit 120 which generates the red contour signal $C_R$ by the difference between the signals $R_{IN}$ and $R_F$. Moreover, a validation circuit 170 receives at its two inputs the filtered video signals from the green and red tubes $G_F$ and $R_F$ and delivers a validation signal $S_{VAL}$ to an input of a multiplier 180 whose other input receives the red contour signal $C_R$. The output of the multiplier circuit 180 is connected to the input of the contour processing circuit 130 which is similar to the contour processing circuit 30 placed in the green channel. Moreover, as in the green channel, the red channel comprises an adder 140 which receives at its first input the filtered red signal $R_F$ and at its second input the processor red contour signal this adder delivers the reconstituted red signal $R_R$. The output of adder 140 is connected to the input of a gamma correction circuit 150 whose output is connected to the first input of a red channel output adder 160; the second input of adder 160 receives the final contour correction signal supplied by the mixing circuit 100 and delivers the corrected red signal $R_C$. The contour correction signal applied to the second input of adder 60, to the second input of adder 160 and also to the blue channel, not shown in the Figure, results from the combination of the contour correction signal from the green channel delivered by the contour processing circuit 30 and the contour correction signal from the red channel delivered by the contour processing circuit 130. Switches 90 and 190 are disposed respectively between the outputs of the processing circuits 30 and 130 and the inputs of the combination circuit 100 and are user-controlled for selectively removing or introducing the contour correction signals into the image.

Figure 2:
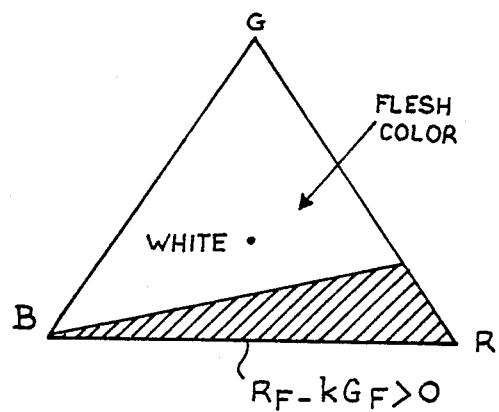
FIG. 2 is an explanatory diagram.

The validation circuit 170 is such that the contour signal $C_R$ is transmitted only when the level of the red filtered signal is much greater than the level of green filtered signal, typically when $R_F$ is greater than $kG_F$, k being between 2 and 3. The red contour signal is then transmitted so that the details with dominant red are ensured. On the other hand, for black and white details, for which the signal of the green channel has the same amplitude as a signal of the red channel, the red contour signal $C_R$ is not validated and the contour signal comes solely from the green channel. The value of coefficient k is chosen so that the contour correction signal from the red channel is not used for flesh colors which are often too detailed and for which the contours must not be emphasized. FIG. 2 shows, in the triangle of the colors, the zone of the points for which the red contour signal is effective in the red zone. This zone is the zone determined by the inequality $R_F - kG_F > 0$.

In actual fact, to eliminate the noise, the validation is obtained by amplifying the signal $R_F - 3G_F$ and limiting this signal to a level corresponding to 50% of $R_F$. Thus, the validation signal also eliminates the noise and the dark areas.

Figure 3:
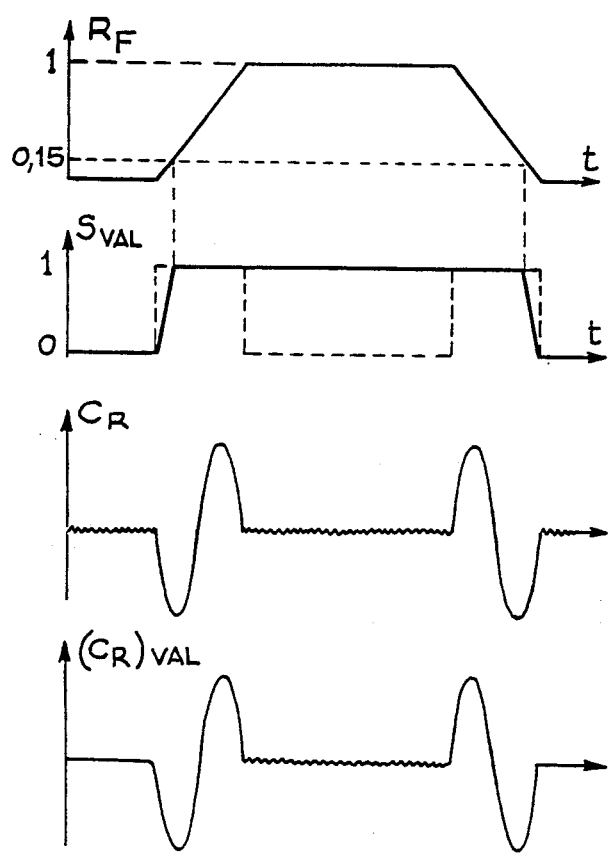
FIGS. 3 and 4 are signal timing diagrams explanatory of the operation of the contour device of the invention.

FIG. 3 shows the timing diagram of a signal in a particular case of a black-red transition, the level of signal R passing from 0 to 1, then from 1 to 0 as a function of time. Since it is assumed that the green signal $G_{IN}$ is nonexistant, the validation signal $S_{VAL}$ passes to 1 as soon as the filtered red signal exceeds 15% by a predetermined nominal value. This validation signal is the signal shown by a continuous line in FIG. 3. The corresponding red contour signal $C_R$ is also shown in FIG. 3. The noise has been shown present in the uniform areas, not only in the dark areas corresponding to $R_F=0$ but also in the red areas corresponding to $R_F=1$. In this case, the red contour signal is validated over the whole of the red area, the noise being eliminated in the dark areas because of the form of the validation signal. On the other hand, the noise is kept in the red uniform areas but may be eliminated in the processing circuit 130.

For eliminating the noise in the uniform red areas also, the validation circuit 170 can perform validation of another type, where the validation signal $S_{VAL}$ remains at 1 only during the transitions. In this case validation circuit 170 detects transitions, and the validation signal has the form shown with broken lines in FIG. 3 and the noise is eliminated in the uniform red areas. Such a validation signal may be obtained from the absolute value of the difference between the input and output signals of filter 110. Connection of signal $R_{IN}$ for this purpose is shown in dotted lines. However, the validation circuit is more complex than the above described validation circuit and causes splitting of the contour, should there be a lack of convergence.

Figure 4:
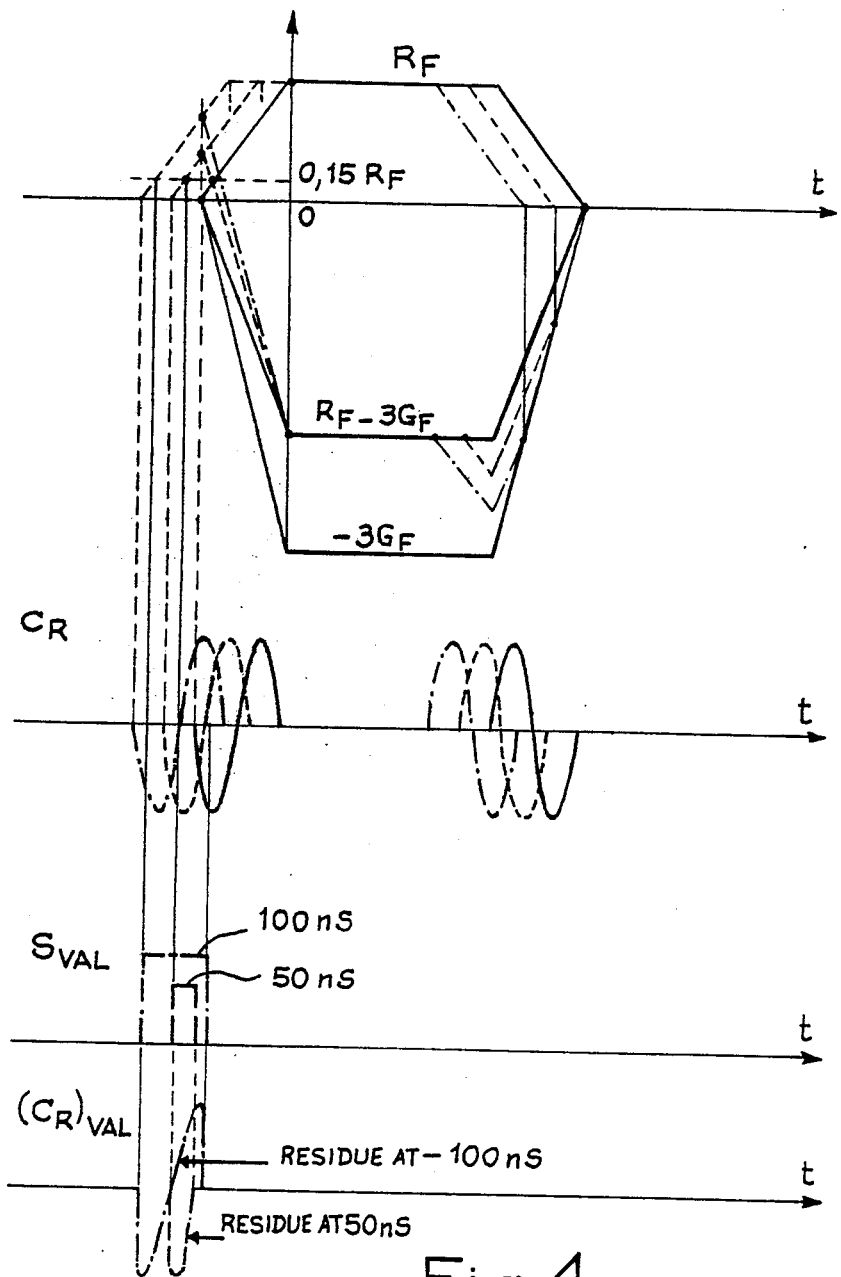

FIG. 4 shows the timing diagram of the signals in the case of transitions for which $R_F-3V_F$ is negative. In this case, the validation signal is always zero and the red contour signal is never validated. However, in the case of a lack of convergence, the red contour signal may be validated for short periods of time, as shown in FIG. 4. This FIG. 4 corresponds to a black-white transition, that is to say $R_{IN}=G_{IN}$ or $R_F=G_F$. In the first timing diagram have been shown the signals $R_F$, $-3G_F$, and $R_F-3G_F$. The continuous line represents the case where there is no in-line lack of convergence. In this case, the red contour signal is the one shown with a continuous line in the second timing diagram $C_R$ and the validation signal $S_{VAL}$ is always zero. The red contour signal is therefore never validated. The broken line represents the case when a lack of convergence of $-50$ nanoseconds exists between the green scanning tube and the red scanning tube. In this case, component $R_F-3G_F$ is greater than $0.15 R_F$ for a short period of time and a short validation pulse then appears. The contour signal is therefore validated for a short period of time corresponding to this pulse, which gives a residue at $-50$ nanoseconds. Similarly, for a lack of convergence of $-100$ nanoseconds between the green scanning tube and the red scanning tube, the red contour signal is offset with respect to the green contour signal and the red contour signal is validated for a period of time corresponding to a validation signal $S_{VAL}=1$ associated with overshooting of $R_F-3G_F$ above the limit fixed at $0.15 R_F$. The residue at $-100$ nanoseconds is therefore a little greater. On the other hand, on the trailing edge of the contour, decorrelation is complete. As can be seen in FIG. 4, good efficiency of the correlation system $R_F-3 G_F$ greater than $0.15 R_F$ is obtained for a lack of convergence which does not exceed $\pm 50$ nanoseconds very little red contour being then superimposed on the black and white detail, the same efficiency is obtained for a lack of convergence of more or less one frame line. Consequently, the contour correction system using, for the introduction of a red contour correction, a correlation between the red and green component by a formula of the positive $R-kG$ type, allows the contours in the green and red components to be emphasized separately. The noise may be limited by separate processing of the two components. But, this correction device of course requires a few more electronic components than with a single contour extracton in the green channel, or than with latticing between the green and red channels before extraction of the contours. This separate adjustment of the red and green contours however considerably improves the appearance of some lines particularly those with dominant red.

The correction device of the invention is not limited to the processing of red and green signals but may also be applied to the processing of red, green and blue signals.

What is claimed is:

1. A device for correcting contours of chrominance signals coming from scanning tubes of a color television camera, comprising:

green filter means, located in a green chrominance channel, for receiving and filtering a green chrominance signal to produce a filtered green chrominance signal;

first means for extracting green contour signals characteristic of transitions in the green chrominance signal by determining a difference between said green chrominance signal and said filtered green chrominance signal;

a contour processing circuit connected to said first means for processing said filtered green chrominance signal;

red filter means, located in a red chrominance channel, for receiving and filtering a red chrominance signal to produce a filtered red chrominance signal;

second means for extracting red contour signals characteristic of transitions in the red chrominance signal by determining a difference between said red chrominance signal and said filtered red chrominance signal;

validation means, receiving said red and green filtered chrominance signals and said red contour signal, for delivering a validated red contour signal when a level of said filtered red chrominance signal $R_F$ is greater than $kG_F$, wherein $G_F$ is a level of said filtered green chrominance signal and k is a coefficient between 2 and 3;

a second contour processing circuit connected to an output of said validation means for processing said red chrominance signal;

a mixing circuit, connected to outputs of said first and second contour processig circuits, for producing a final contour correction signal;

a green output adder located in said green chrominance channel and having one adding input coupled to the green chrominance channel and a second adding input coupled to said final contour correction signal to produce a corrected green chrominance signal at an output thereof; and a red output adder located in the red chrominance channel and having one adding input coupled to the red chrominance channel and another adding input coupled to said final contour correction signal to produce a corrected red chrominance signal at an output thereof.

2. The device as claimed in claim 1, wherein the validation means includes means for forming a combined signal $R_F - kG_F$, means for amplifying said combined signal, and means for limiting said combined signal after said amplifying to a level greater than a predetermined level, thus eliminating noise in dark areas of an image.

3. The device as claimed in claim 1, wherein said validating means validates said red contour signal only during a period during transitions of said red chrominance signal obtained in said first means from the difference between input and output signals of said green filter means.

4. The device as claimed in claim 2, wherein said validating means validates said red contour signal only during a period during transitions of said red chrominance signal obtained in said first means from the difference between input and output signals of said green fitler means.

5. A device for correcting contours of chrominance signals coming from scanning tubes of a color television camera, comprising:

green filter means, located in a green chrominance channel, for receiving and filtering a green chrominance signal to produce a filtered green chrominance signal;

first means for extracting green contour signals characteristic of transitions in the green chrominance signal;

a contour processing circuit connected to said first means;

red filter means, located in a red chrominance channel, for receiving and filtering a red chrominance signal to produce a filtered red chrominance signal;

second means for extracting red contour signals characteristic of transitions in the red chrominance signal;

validation means for receiving said red and green filtered chrominance signals and said red contour signal, for detecting transitions in said filtered chrominance signals, and for delivering a validated red contour signal when a level of the filtered red chrominance signal $R_F$ is appreicably greater than a level of the filtered green chrominance signal only during transitions of said red chrominance signal;

a second contour processing circuit connected to the output of the validation means;

a mixing circuit, connected to outputs of said first and second contour processing circuits, for producing a final contour correction signal;

a green output adder located in said green chrominance channel and having one adding input coupled to the green chrominance channel and a second adding input coupled to said final contour correction signal to produce a corrected green chrominance signal at an output thereof; and a red output adder located in the red chrominance channel and having one adding input coupled to the red chrominance channel and another adding input coupled to said final contour correction signal to produce a corrected red chrominance signal at an output thereof.

* * * * *